US010643252B2

(12) United States Patent
Jeong et al.

(10) Patent No.: US 10,643,252 B2
(45) Date of Patent: May 5, 2020

(54) BANNER DISPLAY METHOD OF ELECTRONIC DEVICE AND ELECTRONIC DEVICE THEREOF

(71) Applicant: Samsung Electronics Co., Ltd., Suwon-si, Gyeonggi-do (KR)

(72) Inventors: Sang-Heon Jeong, Seoul (KR); Jun-Seon Yun, Seoul (KR); Mi-Jung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 556 days.

(21) Appl. No.: 14/432,657

(22) PCT Filed: Dec. 10, 2014

(86) PCT No.: PCT/KR2014/012094
§ 371 (c)(1),
(2) Date: Mar. 31, 2015

(87) PCT Pub. No.: WO2015/108282
PCT Pub. Date: Jul. 23, 2015

(65) Prior Publication Data
US 2016/0019602 A1 Jan. 21, 2016

(30) Foreign Application Priority Data
Jan. 16, 2014 (KR) ........................ 10-2014-0005672

(51) Int. Cl.
G06Q 30/02 (2012.01)
G06F 3/0481 (2013.01)
(Continued)

(52) U.S. Cl.
CPC ....... *G06Q 30/0277* (2013.01); *G06F 3/0482* (2013.01); *G06F 3/0488* (2013.01); *G06F 3/04817* (2013.01); *G06Q 30/0241* (2013.01)

(58) Field of Classification Search
None
See application file for complete search history.

(56) References Cited

U.S. PATENT DOCUMENTS 6,243,856 B1 *  6/2001  Meyer ....................... G06T 9/00
                                                         345/473
6,263,496 B1 *  7/2001  Meyer ....................... G06T 9/00
                                                         345/474
(Continued)

FOREIGN PATENT DOCUMENTS

EP       2916282 A1     9/2015
JP     2013134770 A     7/2013
(Continued)

OTHER PUBLICATIONS

Wroblewski; Touch Gesture Reference Guide; XP055365968; http://www.lukew.com/ff/entry.asp?1071; Apr. 20, 2010.
(Continued)

Primary Examiner — David J Stoltenberg
(74) Attorney, Agent, or Firm — Jefferson IP Law, LLP

(57) ABSTRACT

An advertisement method of an electronic device and the electronic device thereof are provided. The operation method of the electronic device includes the processes of displaying banner advertisement comprising a user selection item, and displaying banner advertisement of a scenario matching to a result of selection of the user selection item.

23 Claims, 16 Drawing Sheets

(51) Int. Cl.
  *G06F 3/0482* (2013.01)
  *G06F 3/0488* (2013.01)

(56) References Cited

U.S. PATENT DOCUMENTS

| | | | | |
|---|---|---|---|---|
| 6,272,650 | B1* | 8/2001 | Meyer | G06F 9/4443 |
| | | | | 380/227 |
| 7,536,385 | B1* | 5/2009 | Wolfe | G06F 16/95 |
| 7,636,093 | B1* | 12/2009 | Kuwamoto | G06T 13/80 |
| | | | | 345/474 |
| 9,275,016 | B1* | 3/2016 | Freund | G06F 16/345 |
| 2004/0189667 | A1* | 9/2004 | Beda | G06T 11/20 |
| | | | | 345/619 |
| 2006/0112167 | A1* | 5/2006 | Steele | H04L 29/06 |
| | | | | 709/206 |
| 2006/0288362 | A1* | 12/2006 | Pulton, Jr. | H04N 7/165 |
| | | | | 725/34 |
| 2007/0260508 | A1* | 11/2007 | Barry | G06Q 30/02 |
| | | | | 705/14.12 |
| 2008/0215991 | A1* | 9/2008 | Berko | G06Q 30/02 |
| | | | | 715/753 |
| 2009/0192972 | A1* | 7/2009 | Spivack | G06Q 10/087 |
| | | | | 706/50 |
| 2009/0192976 | A1* | 7/2009 | Spivack | G06Q 10/087 |
| | | | | 706/55 |
| 2010/0023475 | A1* | 1/2010 | Lahav | G06Q 30/02 |
| | | | | 706/59 |
| 2010/0023581 | A1* | 1/2010 | Lahav | G06Q 30/02 |
| | | | | 709/203 |
| 2010/0222046 | A1* | 9/2010 | Cumming | G06Q 30/02 |
| | | | | 455/418 |
| 2011/0016484 | A1 | 1/2011 | Choi | |
| 2011/0153435 | A1 | 6/2011 | Pisaris-Henderson | |
| 2011/0191176 | A1* | 8/2011 | Merriman | G06Q 30/02 |
| | | | | 705/14.49 |
| 2011/0296351 | A1* | 12/2011 | Ewing, Jr. | G06F 3/0346 |
| | | | | 715/841 |
| 2012/0001914 | A1* | 1/2012 | Pan | G06Q 30/0241 |
| | | | | 345/428 |
| 2012/0278163 | A1* | 11/2012 | Spivack | G06Q 10/087 |
| | | | | 705/14.49 |
| 2013/0097029 | A1* | 4/2013 | Mhatre | G06Q 50/10 |
| | | | | 705/14.72 |
| 2013/0166393 | A1 | 6/2013 | Lee et al. | |
| 2013/0179267 | A1 | 7/2013 | Lee | |
| 2013/0305170 | A1* | 11/2013 | de Souza | G06F 3/0485 |
| | | | | 715/760 |
| 2014/0149916 | A1* | 5/2014 | Manoff | G06F 3/0488 |
| | | | | 715/781 |
| 2014/0164147 | A1* | 6/2014 | Jacobson | G06Q 30/0277 |
| | | | | 705/14.73 |
| 2014/0195890 | A1* | 7/2014 | Taylor | G06F 3/0483 |
| | | | | 715/234 |
| 2014/0279025 | A1* | 9/2014 | Klanjsek | G06Q 30/0276 |
| | | | | 705/14.64 |
| 2014/0279028 | A1* | 9/2014 | Doser | G06Q 30/0267 |
| | | | | 705/14.64 |
| 2015/0206180 | A1* | 7/2015 | Iyer | G06Q 30/0251 |
| | | | | 705/14.49 |
| 2015/0254732 | A1* | 9/2015 | Snyder | G06Q 30/0276 |
| | | | | 705/14.72 |
| 2015/0356602 | A1* | 12/2015 | Moore | G06Q 30/0244 |
| | | | | 705/14.55 |
| 2016/0019602 | A1 | 1/2016 | Jeong et al. | |

FOREIGN PATENT DOCUMENTS

| | | | |
|---|---|---|---|
| JP | 2013134774 A | 7/2013 | |
| JP | 2013-257837 A | 12/2013 | |
| KR | 10-2009-0085530 A | 8/2009 | |
| KR | 10-2009-0085769 A | 8/2009 | |
| KR | 10-2011-0109290 A | 10/2011 | |
| KR | 10-2012-0015005 A | 2/2012 | |
| KR | 10-2013-0089907 A | 8/2013 | |
| KR | 10-2013-0142639 A | 12/2013 | |
| WO | WO 1999/039309 A1 * | 8/1999 | G06T 15/70 |
| WO | WO 1999/039265 A9 * | 10/1999 | G06F 9/44 |

OTHER PUBLICATIONS

Chinese Office Action dated Mar. 21, 2019, issued in a counterpart Chinese application No. 201480003812.X.
Chinese Office Action dated Oct. 9, 2019, issued in Chinese Patent Application No. 201480003812.X.

* cited by examiner

Scenario information

| scene_id | image | direction UI | link |
|---|---|---|---|
| S | 640X100 banner | Left | P-1 |
| | | Right | P-2 |
| P-1 | 640X100 banner | Up | P-1-1 |
| | | Down | P-1-2 |
| P-1-1 | 640X100 banner | Left | P-1-1-1 |
| | | Right | P-1-1-2 |
| | | Down | P-1-1-3 |
| P-1-2 | 640X100 banner | – | – |
| P-1-1-1 | 640X100 banner | – | – |
| P-1-1-2 | 640X100 banner | – | – |
| P-1-1-3 | 640X100 banner | – | – |
| P-2 | 640X100 banner | Left | P-2-1 |
| | | Right | P-2-2 |
| P-2-1 | 640X100 banner | – | – |
| P-2-2 | 640X100 banner | Up | P-1-1-3 |
| | | Down | P-2-2-1 |
| P-2-2-1 | 640X100 banner | – | – |

FIG.10

Chapter information

| Chapter | representative | path |
|---|---|---|
| Chapter 1 | S | P-1 |
| | | P-2 |
| Chapter 2 | P-1 | P-1-1 |
| | | P-1-2 |
| Chapter 3 | P-2 | P-2-1 |
| | | P-2-2 |
| Chapter 4 | P-1-1 | P-1-1-1 |
| | | P-1-1-2 |
| | | P-1-1-3 |
| Chapter 5 | P-2-2 | P-2-2-2 |
| | | P-1-1-3 |

FIG.12

Request Parameter

| Inventory Info. | publisher's inventory_id | | |
| --- | --- | --- | --- |
| | public IP address | | |
| | inventory size | 322x76 | |
| | | 295x169 | |
| | | -- | |
| | -- | | |
| Terminal Info. | terminal_id | | |
| | platform_version | | |
| | terminal_type | mobile | |
| | | tablet | |
| | | -- | |
| | -- | | |
| Tracking Info. | contents_id | | |
| | user interaction type | swipe | left |
| | | | right |
| | | | up |
| | | | down |
| | | -- | |
| | -- | | |
| -- | | | |

FIG.15

Tracking Management Information

| tracking type | request |
| | response |
| | -- |
| contents id | |
| object id | |
| object type | image |
| | button |
| | -- |
| action type | click to call |
| | click to web |
| | -- |
| terminal unique id | |
| user interaction | opened |
| | played |
| | swipe |
| | -- |
| staying time | |
| -- | |

FIG.16

BANNER DISPLAY METHOD OF ELECTRONIC DEVICE AND ELECTRONIC DEVICE THEREOF

TECHNICAL FIELD

Various exemplary embodiments of the present disclosure relate to an advertisement method of an electronic device and the electronic device thereof.

BACKGROUND

Electronic devices of various types such as smart phones or tablet Personal Computers (PCs) can receive advertising contents such as product introduction, company marketing, and the like from an advertisement server and the like through a network and display the received advertising contents as banner advertisement of a small size in partial regions of display screens of the electronic devices.

A carousel advertising technology can display various advertisement images as banner advertisement and show the advertisement images to users. But, the carousel advertising technology cannot check whether the advertisement images have been effectively presented to the users, users' interaction, and the like, because displaying decided advertisement images at regular intervals of time regardless user's selection.

Unlike the carousel advertising technology displaying the banner advertisement of the small size in the partial region of the display screen, a rich media advertising technology displays an advertisement image in a full region of the display screen. Therefore, while the advertisement image is displayed in the full region of the display screen, a user cannot see an image of other contents. Further, the user cannot execute advertising contents until the whole data of the advertising contents are all downloaded.

SUMMARY

Various exemplary embodiments of the present disclosure are to provide an advertisement method of an electronic device and the electronic device thereof capable of efficiently displaying banner advertisement of various scenarios matching to user's selection, in the electronic device such as a smart phone, a tablet Personal Computer (PC) or the like.

Various exemplary embodiments of the present disclosure are to provide an advertisement method of an electronic device and the electronic device thereof capable of transmitting banner advertisement of various scenarios selected by a user, to a smart phone, a tablet PC or the like accessed through a network, in the electronic device such as an advertisement server and the like.

An exemplary embodiment of the present disclosure may provide an operation method of an electronic device including the processes of displaying banner advertisement comprising a user selection item, and displaying banner advertisement of a scenario matching to a result of selection of the user selection item.

An exemplary embodiment of the present disclosure may provide an electronic device including a display module for displaying banner advertisement, and a processor for deciding a scenario of the banner advertisement. The processor decides the scenario of the banner advertisement in accordance to a result of selection of a user selection item comprised in the banner advertisement.

An exemplary embodiment of the present disclosure may provide an operation method of an electronic device including the processes of transmitting banner advertisement comprising a user selection item, to a terminal, receiving a result of selection of the user selection item from the terminal, and transmitting banner advertisement of a scenario matching to the selection result to the terminal.

An exemplary embodiment of the present disclosure may provide an electronic device including a communication module for communicating with a terminal through a network, and a processor for controlling the communication module. The processor transmits banner advertisement comprising a user selection item, to a terminal, and receives a result of selection of the user selection item from the terminal, and transmits banner advertisement of a scenario matching to the selection result to the terminal.

BRIEF DESCRIPTION OF THE DRAWINGS

The above and other objects, features and advantages of the present disclosure will become more apparent from the following detailed description when taken in conjunction with the accompanying drawings in which:

FIG. 10 is a diagram illustrating scenario information according to various exemplary embodiments of the present disclosure;

FIG. 12 is a diagram illustrating chapter information according to various exemplary embodiments of the present disclosure;

FIG. 15 is a diagram illustrating a request parameter according to various exemplary embodiments of the present disclosure; and FIG. 16 is a diagram illustrating tracking management information according to various exemplary embodiments of the present disclosure.

DETAILED DESCRIPTION

Figure 1:
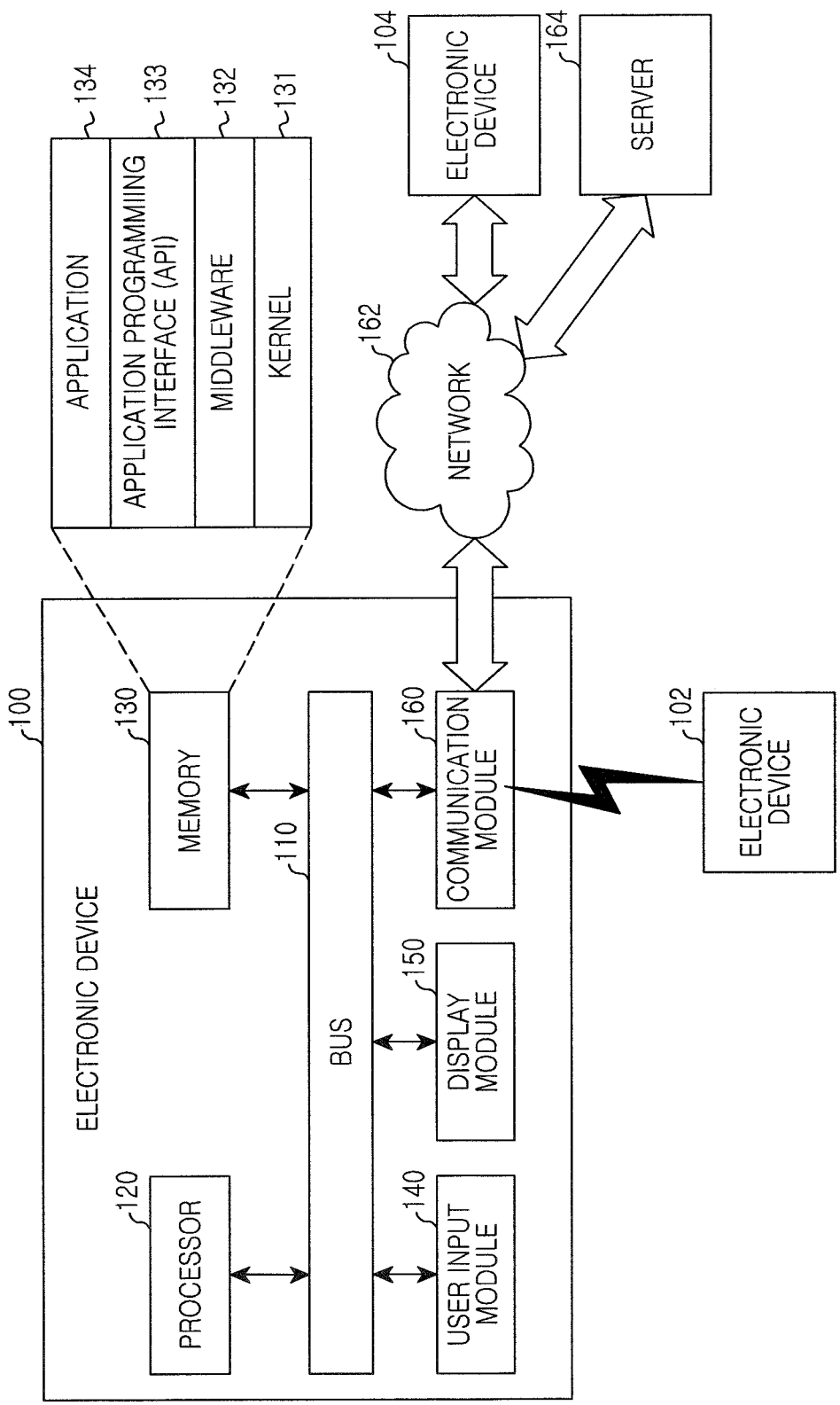
FIG. 1 is a block diagram illustrating a construction of an electronic device according to various exemplary embodiments of the present disclosure.

The present disclosure is described below with reference to the accompanying drawings. The present disclosure exemplifies specific exemplary embodiments in the drawings and states a related detailed description, but may make various modifications and may have several exemplary embodiments. Accordingly, it should be understood that the present disclosure does not intend to limit a specific embodiment form, and includes all modifications or equivalents or substitutes included in the spirit and technological scope of the present disclosure. In relation to a description of the drawing, like reference symbols denote like constituent elements.

An electronic device according to the present disclosure may be a device including a telecommunication function. For example, the electronic device may be one or a combination of more of various devices such as a smart phone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MPEG Audio Layer 3 (MP3) player, a mobile medical instrument, an electronic bracelet, an electronic necklace, an appcessory, a camera, a wearable device, an electronic clock, a wrist watch, a smart white appliance (e.g., a refrigerator, an air conditioner, a cleaner, an artificial intelligence robot, a TV, a Digital Video Disk (DVD) player, an audio system, an oven, a microwave, a washing machine, an air cleaner, an electronic frame, and the like), various medical instruments (e.g., Magnetic Resonance Angiography (MRA), Magnetic Resonance Imaging (MRI), Computerized Tomography (CT), a moving-camera, an ultrasonic machine and the like), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an electronic dictionary, a car infotainment device, an electronic equipment for ship (for example, a navigation device for ship, a gyrocompass and the like), avionics, a security instrument, electronic clothes, an electronic locking system, a camcorder, a game console, a Head-Mounted Display (HMD), a flat panel display device, an electronic album, part of a furniture or building/structure including a telecommunication function, an electronic board, an electronic signature receiving device, a projector, and the like. It is apparent to those skilled in the art that the electronic device according to the present disclosure is not limited to the aforementioned instruments.

FIG. 1 is a block diagram illustrating a construction of an electronic device according to one exemplary embodiment of the present disclosure.

Referring to FIG. 1, the electronic device 100 may include a bus 110, a processor 120, a memory 130, a user input module 140, a display module 150, and a communication module 160. The bus 110 may be a circuit connecting the aforementioned constituent elements with one another, and forwarding communication (e.g., control message) between the aforementioned constituent elements.

The processor 120 may, for example, receive instructions from the aforementioned other constituent elements (e.g., the memory 130, the user input module 140, the display module 150, the communication module 160, and the like) through the bus 110, decipher the received instructions, and execute operation or data processing according to the deciphered instructions.

The memory 130 may store an instruction or data which is received from the processor 120 or the other constituent elements (e.g., the user input module 140, the display module 150, the communication module 160, and the like) or is generated by the processor 120 or the other constituent elements. The memory 130 may include, for example, programming modules such as a kernel 131, a middleware 132, an Application Programming Interface (API) 133, applications 134 or the like. The aforementioned respective programming modules may be comprised of software, firmware, hardware or a combination of at least two or more of them.

The kernel 131 may control or manage system resources (e.g., the bus 110, the processor 120, the memory 130 or the like) used for executing operations or functions implemented in the remnant other programming modules, for example, the middleware 132, the API 133, or the applications 134. Also, the kernel 131 may provide an interface of enabling the middleware 132, the API 133, or the applications 134 to access and control or manage the individual constituent element of the electronic device 100.

The middleware 132 may perform a relay role of enabling the API 133 or the applications 134 to communicate and exchange data with the kernel 131. Also, in relation with work requests received from the (plurality of) applications 134, the middleware 132 may, for example, perform load balancing for the work request using a method of allotting at least one application among the (plurality of) applications 134 priority order capable of using the system resources (e.g., the bus 110, the processor 120, the memory 130 or the like) of the electronic device 100 and the like.

The API 133 is an interface of enabling the applications 134 to control a function provided by the kernel 131 or the middleware 132. The API 133 may include, for example, at least one interface or function for file control, window control, image processing, character control or the like.

The user input module 140 may, for example, receive an input of an instruction or data from a user and forward the instruction or data to the processor 120 or the memory 130 through the bus 110. The display module 150 may display an image, a video, data or the like to the user.

The communication module 160 may establish communication between the electronic device 100 and another electronic device 102. The communication module 160 may support a certain short-range communication protocol (e.g., Wireless Fidelity (WiFi), Bluetooth (BT), or Near Field Communication (NFC)), and a certain network communication 162 (e.g., the Internet, a Local Area Network (LAN), a Wide Area Network (WAN), a telecommunication network, a cellular network, a satellite network, a Plain Old Telephone System (POTS) or the like). The electronic devices 102 and 104 each may be the same (e.g., same-type) device as the electronic device 100 or may be a different (e.g., different-type) device.

Figure 2:
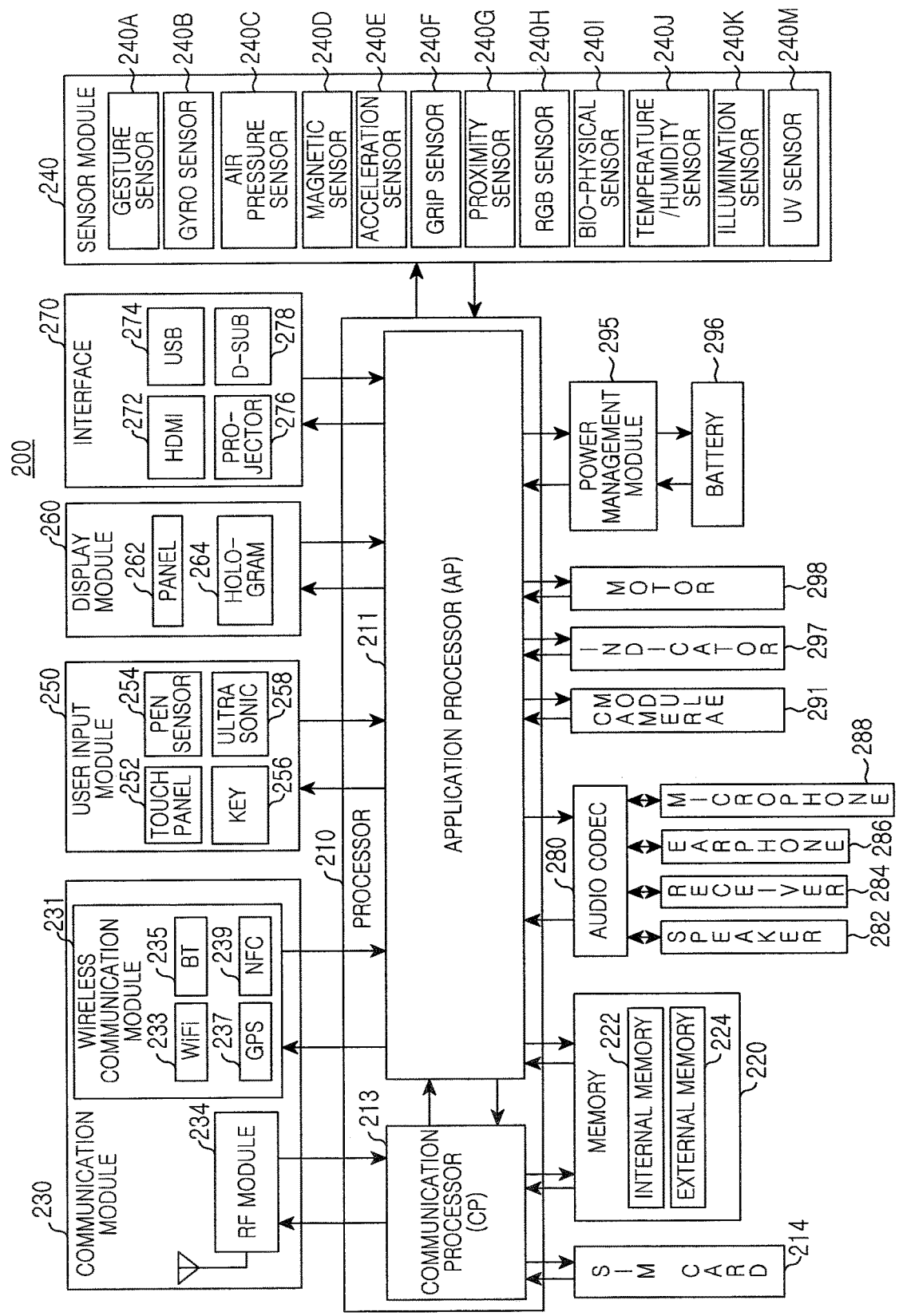
FIG. 2 is a block diagram illustrating a construction of hardware according to various exemplary embodiments of the present disclosure.

FIG. 2 is a block diagram illustrating a construction of hardware according to one exemplary embodiment of the present disclosure. The hardware 200 may be, for example, the electronic device 100 illustrated in FIG. 1.

Referring to FIG. 2, the hardware 200 may include one or more processors 210, a Subscriber Identification Module (SIM) card 214, a memory 220, a communication module 230, a sensor module 240, a user input module 250, a display module 260, an interface 270, an audio codec 280, a camera module 291, a power management module 295, a battery 296, an indicator 297, or a motor 298.

The processor 210 (e.g., the processor 120) may include one or more Application Processors (APs) 211 or one or more Communication Processors (CPs) 213. The processor 210 may be, for example, the processor 120 illustrated in FIG. 1. FIG. 2 illustrates that the AP 211 and the CP 213 are included within the processor 210, but the AP 211 and the CP 213 may be included within different IC packages, respectively. In one exemplary embodiment, the AP 211 and the CP 213 may be included within one IC package.

The AP 211 may drive an operating system or an application program and control a plurality of hardware or software constituent elements connected to the AP 211, and perform processing and operations of various data including multimedia data. The AP 211 may be, for example, implemented as a System on Chip (SoC). According to one exemplary embodiment, the processor 210 may further include a Graphic Processing Unit (GPU) (not shown).

The CP 213 may perform a function of managing a data link and converting a communication protocol in a communication between an electronic device (e.g., the electronic device 100) including the hardware 200 and another electronic device 104 connected through a network 162. The CP 213 may be implemented as a SoC, for example. According to one exemplary embodiment, the CP 213 may perform at least part of a multimedia control function. The CP 213 may perform terminal distinction and authentication within a communication network, using a subscriber identity module (e.g., the SIM card 214). Also, the CP 213 may provide services such as voice telephony, video telephony, a text message, packet data or the like to a user.

Also, the CP 213 may control data transmission/reception of the communication module 230. FIG. 2 illustrates that the constituent elements such as the CP 213, the power management module 295, the memory 220 or the like as constituent elements separate from the AP 211 but, according to one exemplary embodiment, the AP 211 may be implemented to include at least some (e.g., the CP 213) of the aforementioned constituent elements. According to one exemplary embodiment, the AP 211 or the CP 213 may load to a volatile memory an instruction or data received from a non-volatile memory connected to each of the AP 211 and the CP 213 or at least one of other constituent elements, and process the loaded instruction or data. Also, the AP 211 or the CP 213 may store in the non-volatile memory data received from at least one of the other constituent elements or generated by at least one of the other constituent elements.

The SIM card 214 may be a card implementing the subscriber identity module, and may be inserted into a slot provided in a specific location of the electronic device. The SIM card 214 may include unique identification information (e.g., Integrated Circuit Card ID (ICCID)) or subscriber information (e.g., International Mobile Subscriber Identity (IMSI)).

The memory 220 may include an internal memory 222 or an external memory 224. The memory 220 may be, for example, the memory 130 illustrated in FIG. 1. The internal memory 222 may include, for example, at least one of a volatile memory (e.g., a Dynamic Random Access Memory (DRAM), a Static Random Access Memory (SRAM), a Synchronous Dynamic Random Access Memory (SDRAM) and the like) or a non-volatile memory (e.g., a One Time PROM (OTPROM), a Programmable ROM (PROM), an Erasable Programmable ROM (EPROM), an Electrically Erasable Programmable ROM (EEPROM), a mask Read Only Memory (ROM), a flash ROM, a Not AND (NAND) flash memory, a Not OR (NOR) flash memory and the like).

According to one exemplary embodiment, the internal memory 222 may take a form of Solid State Drive (SSD). The external memory 224 may further include, for example, Compact Flash (CF), Secure Digital (SD), Micro Secure Digital (Micro-SD), Mini Secure Digital (Mini-SD), extreme Digital (xD), a memory stick or the like.

The communication module 230 may include a wireless communication module 231 or a Radio Frequency (RF) module 234. The communication module 230 may be, for example, the communication module 160 illustrated in FIG. 1. The wireless communication module 231 may include, for example, WiFi 233, BT 235, GPS 237 or NFC 239. For example, the wireless communication module 231 may provide a wireless communication function using radio frequency.

Additionally or alternatively, the wireless communication module 231 may include a network interface (e.g., a LAN card), a modem or the like for connecting the hardware 200 with a network (e.g., the Internet, a LAN, a WAN, a telecommunication network, a cellular network, a satellite network, a POTS or the like).

The RF module 234 may take charge of transmission/reception of data, for example, transmission/reception of an RF signal or a called electric signal. The RF module 234 may include, though not illustrated, for example, a transceiver, a Power Amp Module (PAM), a frequency filter, a Low Noise Amplifier (LNA) or the like. The RF module 234 may further include a component for transmitting/receiving an electromagnetic wave on a free space in a wireless communication, for example, a conductor, a conductive line or the like.

The sensor module 240 may include, for example, at least one of a gesture sensor 240A, a gyro sensor 240B, an air pressure sensor 240C, a magnetic sensor 240D, an acceleration sensor 240E, a grip sensor 240F, a proximity sensor 240G, a Red Green Blue (RGB) sensor 240H, a bio-physical sensor 240I, a temperature/humidity sensor 240J, an illumination sensor 240K, or a Ultraviolet (UV) sensor 240M. The sensor module 240 may measure a physical quantity or sense an activation state of the electronic device and convert the measured or sensed information into an electric signal.

Additionally or alternatively, the sensor module 240 may include, for example, an Electronic nose (E-nose) sensor (not shown), an Electromyography (EMG) sensor (not shown), an Electroencephalogram (EEG) sensor (not shown), an Electrocardiogram (ECG) sensor (not shown), a fingerprint sensor (not shown) or the like. The sensor module 240 may further include a control circuit for controlling at least one or more sensors provided therein.

The user input module 250 may include a touch panel 252, a (digital) pen sensor 254, a key 256, or an ultrasonic input device 258. The user input module 250 may be, for example, the user input module 140 illustrated in FIG. 1. The touch panel 252 may recognize, for example, a touch input in at least one method among a capacitive method, a pressure sensitive method, an infrared method, or an ultrasonic method.

The touch panel 252 may also further include a controller (not shown). In the capacitive method, proximity recognition as well as direct touch is possible. The touch panel 252 may also further include a tactile layer. In this case, the touch panel 252 may provide a tactile response to a user. The (digital) pen sensor 254 may be implemented, for example, using the same or similar method with receiving a user's touch input or a separate recognizing sheet. The key 256 may be, for example, a keypad or a touch key.

The ultrasonic input device 258 is a device capable of identifying data by sensing a sound wave with a microphone (e.g., a microphone 288) of the electronic device through a pen generating an ultrasonic signal, and may perform wireless recognition. According to one exemplary embodiment, the hardware 200 may receive a user input from an external device (e.g., a network, a computer, or a server) connected to the hardware 200 using the communication module 230.

The display module 260 may include a panel 262 or a hologram 264. The display module 260 may be, for example, the display module 150 illustrated in FIG. 1. The panel 262 may be, for example, a Liquid Crystal Display (LCD), an Active-Matrix Organic Light-Emitting Diode (AMOLED), or the like. The panel 262 may be implemented to be flexible, transparent, or wearable, for example. The panel 262 may be also constructed as one module together with the touch panel 252. The hologram 264 may show a three-dimensional image in the air by using interference of light. According to one exemplary embodiment, the display module 260 may further include a control circuit for controlling the panel 262 or the hologram 264.

The interface 270 may include, for example, a High-Definition Multimedia Interface (HDMI) 272, a Universal Serial Bus (USB) 274, a projector 276, or a D-subminiature (D-sub) 278. Additionally or alternatively, the interface 270 may include, for example, Secure Digital/Multi Media Card (SD/MMC) (not shown) or Infrared Data Association (IrDA) (not shown).

The audio codec 280 may convert a voice and an electric signal interactively. The audio codec 280 may convert, for example, voice information that is inputted or outputted through a speaker 282, a receiver 284, an earphone 286, the microphone 288, or the like. The camera module 291 is a device capable of taking a picture and a video. According to one exemplary embodiment, the camera module 291 may include one or more image sensors (e.g., front lenses or rear lenses), an Image Signal Processor (ISP) (not shown), or a flash LED (not shown).

The power management module 295 may manage electric power of the hardware 200. Though not illustrated, the power management module 295 may include, for example, a Power Management Integrated Circuit (PMIC), a charger Integrated Circuit (IC), or a battery fuel gauge. The PMIC may be mounted, for example, within an integrated circuit or a SoC semiconductor. A charging method may be divided into a wired charging method and a wireless charging method. The charger IC may charge a battery, and may prevent the inflow of overvoltage or overcurrent from an electric charger.

According to one exemplary embodiment, the charger IC may include a charger IC for at least one of the wired charging method or the wireless charging method. As the wireless charging method, there are a magnetic resonance method, a magnetic induction method, an electromagnetic wave method or the like, for example. Supplementary circuits for wireless charging, for example, circuits such as a coil loop, a resonance circuit, a rectifier and the like may be added.

The battery fuel gauge may measure, for example, a level of the battery 296, a charging voltage thereof, a charging current thereof, or a charging temperature thereof. The battery 296 may generate electricity and supply power. The battery 296 may be, for example, a rechargeable battery.

The indicator 297 may indicate a specific state of the hardware 200 or a part (e.g., the AP 211) thereof, for example, a booting state, a message state, a charging state or the like. The motor 298 may convert an electric signal into a mechanical vibration. Though not illustrated, the hardware 200 may include a processing device (e.g., a GPU) for mobile TV support. The processing device for mobile TV support may process, for example, standard media data of Digital Multimedia Broadcasting (DMB), Digital Video Broadcasting (DVB), a media flow or the like.

The names of the aforementioned constituent elements of the hardware according to the present disclosure may be different according to the kind of the electronic device. The hardware according to the present disclosure may include at least one of the aforementioned constituent elements, and may omit some constituent elements or further include additional other constituent elements. Also, some of the constituent elements of the hardware according to various exemplary embodiments of the present disclosure are combined and constructed as one entity, thereby being able to identically perform the functions of the corresponding constituent elements before combination.

Figure 3:
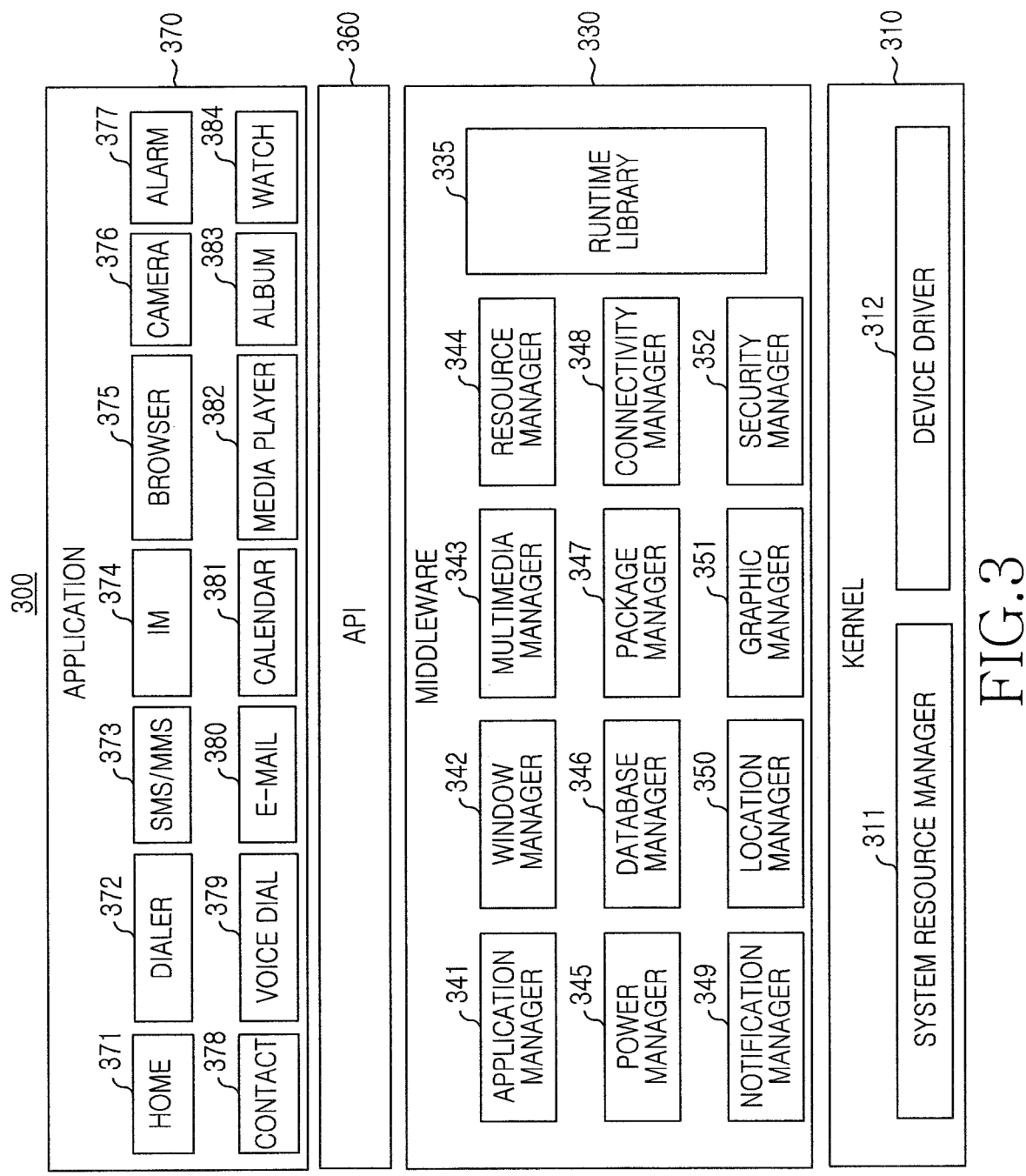
FIG. 3 is a block diagram illustrating a construction of a programming module according to various exemplary embodiments of the present disclosure.

FIG. 3 is a block diagram illustrating a construction of a programming module according to one exemplary embodiment of the present disclosure.

The programming module 300 may be included (e.g., stored) in the electronic device 100 (e.g., the memory 130) illustrated in FIG. 1. At least part of the programming module 300 may be comprised of software, firmware, hardware, or a combination of at least two or more of them.

The programming module 300 may include an Operating System (OS) which is implemented in hardware (e.g., the hardware 200) and controls resources related to the electronic device (e.g., the electronic device 100), or various applications (e.g., an application 370) which are run in the operating system. For example, the operating system may be Android, iPhone OS (iOS), Windows, Symbian, Tizen, Bada, or the like. Referring to FIG. 3, the programming module 300 may include a kernel 310, a middleware 330, an API 360, or the application 370.

The kernel 310 (e.g., the kernel 131) may include a system resource manager 311 or a device driver 312. The system resource manager 311 may include, for example, although not shown, a process management unit, a memory management unit, a file system management unit, or the like. The system resource manager 311 may perform control of a system resource, allocation thereof, recovery thereof, or the like. The device driver 312 may include, for example, although not shown, a display driver, a camera driver, a Bluetooth driver, a shared memory driver, a USB driver, a keypad driver, a WiFi driver, or an audio driver. Also, according to one exemplary embodiment, the device driver 312 may include an Inter-Process Communication (IPC) driver (not shown).

The middleware 330 may include a plurality of modules previously implemented to provide functions commonly required by the applications 370. Also, the middleware 330 may provide the functions to the applications 370 through the API 360 such that the applications 370 may make efficient use of restricted system resources within the electronic device.

For example, as illustrated in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that is used by a compiler to add a new function through a programming language while the application 370 is run. According to one exemplary embodiment, the runtime library 335 may perform a function of input/ output, memory management, arithmetic function or the like. The application manager 341 may manage, for example, a life cycle of at least one application among the applications 370. The window manager 342 may manage a GUI resource used in a screen.

The multimedia manager 343 may grasp a format necessary for playing various media files, and perform encoding or decoding of the media file using a codec adapted to the corresponding format. The resource manager 344 may manage a resource such as a source code of at least any one application among the applications 370, a memory thereof, a storage space thereof, or the like.

The power manager 345 may operate together with a Basic Input/Output System (BIOS) and the like and manage a battery or power source, and provide electric power information and the like necessary for the operation. The database manager 346 may manage to create, search or change a database that will be used in at least one application among the applications 370.

The package manager 347 may manage installation or updating of an application which is distributed in a form of a package file. The connectivity manager 348 may manage, for example, wireless connectivity such as WiFi, Bluetooth or the like. The notification manager 349 may display or notify an event such as an arrival message, an appointment, a proximity notification and the like in a way not disturbing a user. The location manager 350 may manage location information of the electronic device.

The graphic manager 351 may manage a graphic effect to be provided to the user or a user interface related to this. The security manager 352 may provide a general security function necessary for system security, user authentication or the like. According to one exemplary embodiment, if the electronic device (e.g., the electronic device 100) has a phone function, the middleware 330 may further include a telephony manager (not shown) for managing a voice or video telephony function of the electronic device.

The middleware 330 may create and use a new middleware module through a combination of various functions of the aforementioned internal constituent element modules. The middleware 330 may provide a module that is specialized by kind of the operating system to provide a differentiated function. Also, the middleware 330 may dynamically delete some of the existing constituent elements or add new constituent elements. Accordingly, the middleware 330 may omit some of the constituent elements stated in an exemplary embodiment of the present disclosure or further include other constituent elements or substitute other constituent elements with constituent elements of different names performing similar functions.

The API 360 (e.g., the API 133), a set of API programming functions, may be provided to have a different construction in accordance to the operating system. For example, in a case of Android or iOS, it may, for example, provide one API set by platform and, in a case of Tizen, it may, for example, provide two or more API sets by platform. The applications 370 (e.g., the applications 134) may include, for example, a preloaded application or a third party application.

At least part of the programming module 300 may be implemented by an instruction stored in a computer-readable storage media. When the instruction is executed by one or more processors (e.g., the processor 210), the one or more processors may perform a function corresponding to the instruction. The computer-readable storage media may be, for example, the memory 260. At least part of the programming module 300 may be implemented (e.g., executed), for example, by the processor 210.

At least part of the programming module 300 may include, for example, a module, a program, a routine, an instruction set, a process or the like for performing one or more functions. The names of the constituent elements of the programming module (e.g., the programming module 300) according to the present disclosure may be different in accordance to the kind of the operating system. Also, the programming module according to the present disclosure may include at least one or more of the aforementioned constituent elements, omit some of the aforementioned constituent elements, or further include additional other constituent elements.

Operation principle of the present disclosure will be described herein below with reference to the accompanying drawings. In describing the present disclosure below, well-known functions or constructions are not described in detail since they would obscure the disclosure in unnecessary detail.

The terms described below defined considering functions in the present disclosure may be modified in accordance to user and operator's intention or practice. Therefore, the definition should be given on the basis of the content throughout the present specification.

An advertisement method of an electronic device and the electronic device thereof according to various exemplary embodiments of the present disclosure are described below in detail. The electronic device according to the various exemplary embodiments of the present disclosure may be an electronic device such as a smart phone, a tablet PC or the like, or may be an electronic device such as an advertisement server and the like. The electronic device such as the smart phone, the tablet PC or the like may be called a terminal, and the electronic device such as the advertisement server and the like may be called a server.

Figure 4:
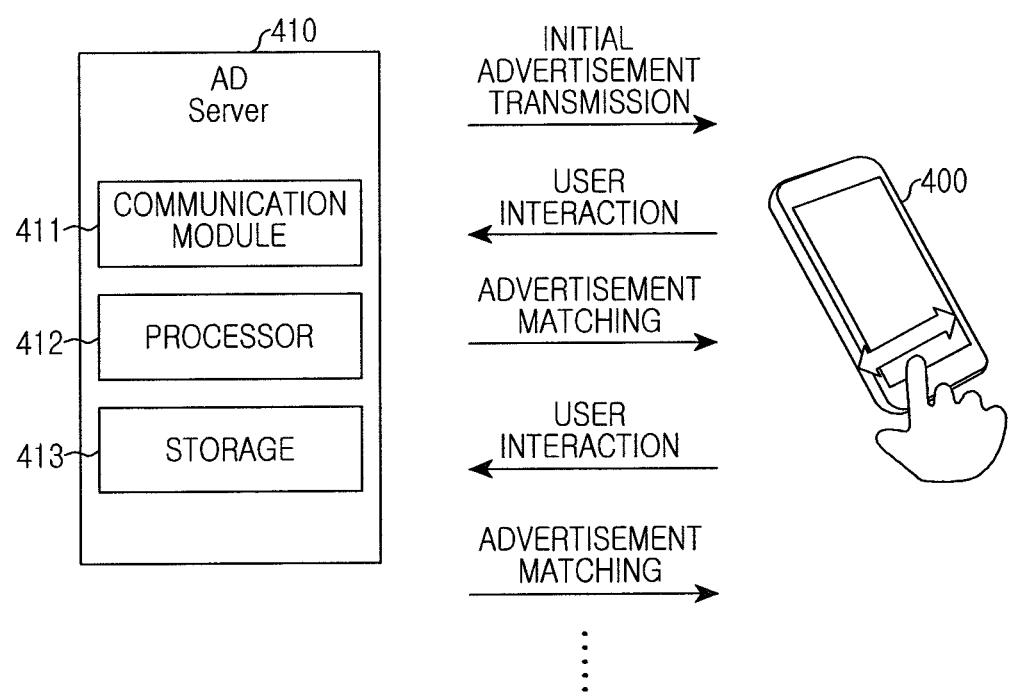
FIG. 4 is a diagram illustrating communication between an advertisement server and a terminal according to various exemplary embodiments of the present disclosure.

The terminal may include the constituent elements illustrated in FIG. 3. The server may include, for example, as illustrated in FIG. 4, a communication module 411, a processor 412, a storage 413, and the like. The communication module 411 communicates with a terminal 400 accessed through a network. The processor 412 controls the communication module 411 to transmit advertising contents stored within the storage 413 to the terminal 400. The storage 413 may be included within the server 410, or may be separated as a separate database and the like.

The advertising contents may be banner advertisement of various scenarios having different paths in accordance to user's selection. For example, as illustrated in FIG. 4, if the server 410 transmits banner advertisement to the terminal 400, the terminal 400 displays the banner advertisement in a partial region of a display screen. If a user touch is detected in various methods of Drag, Swipe, Tap and the like within the partial region in which the banner advertisement is displayed, the terminal 400 judges that the user touch is user interaction on the banner advertisement.

Figure 5:
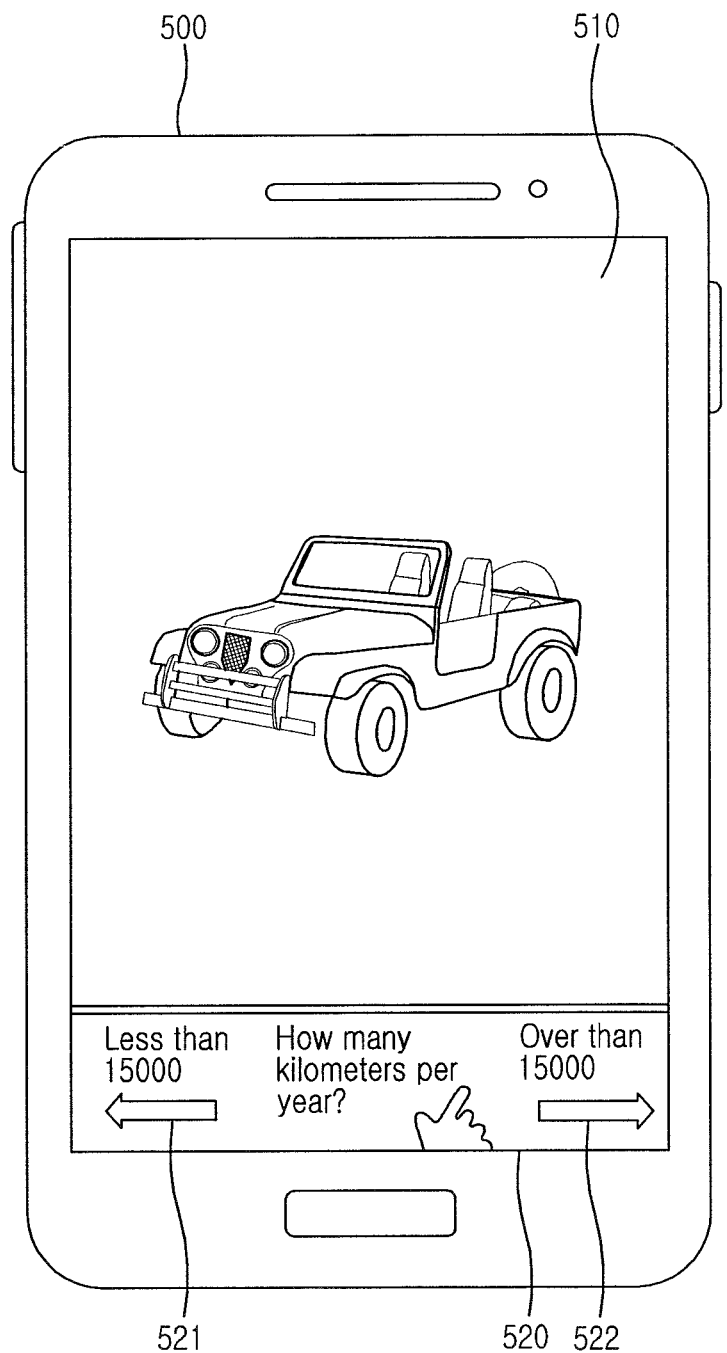
FIG. 5 is a diagram illustrating an advertisement screen of an electronic device according to various exemplary embodiments of the present disclosure.

The terminal 400 creates a message including information for notifying the user interaction, for example, user interaction information, and transmits the created message to the server 410. The server 410 checks the user interaction information included in the message, and chooses banner advertisement of a scenario matching to the user interaction information, and transmits the chosen banner advertisement to the terminal 400. For example, as illustrated in FIG. 5, a display screen of a terminal 500 may be divided into a first region displaying a main image 510 and a second region displaying a banner advertisement image 520. The second region displaying the banner advertisement image 520 may be also given wider than the first region displaying the main image 510.

The banner advertisement image 520 displayed in the second region may variously display, for example, icons, indicators or the like for selecting paths, directions or the like of any one or more of up, down, left, right, as user selection items 521 and 522. The user selection item may be selected by a user, for example, in various touch methods such as Drag, Swipe, Tap and the like. The terminal 500 may display banner advertisement of a scenario matching to a result of selection of the user selection item.

Figure 6:
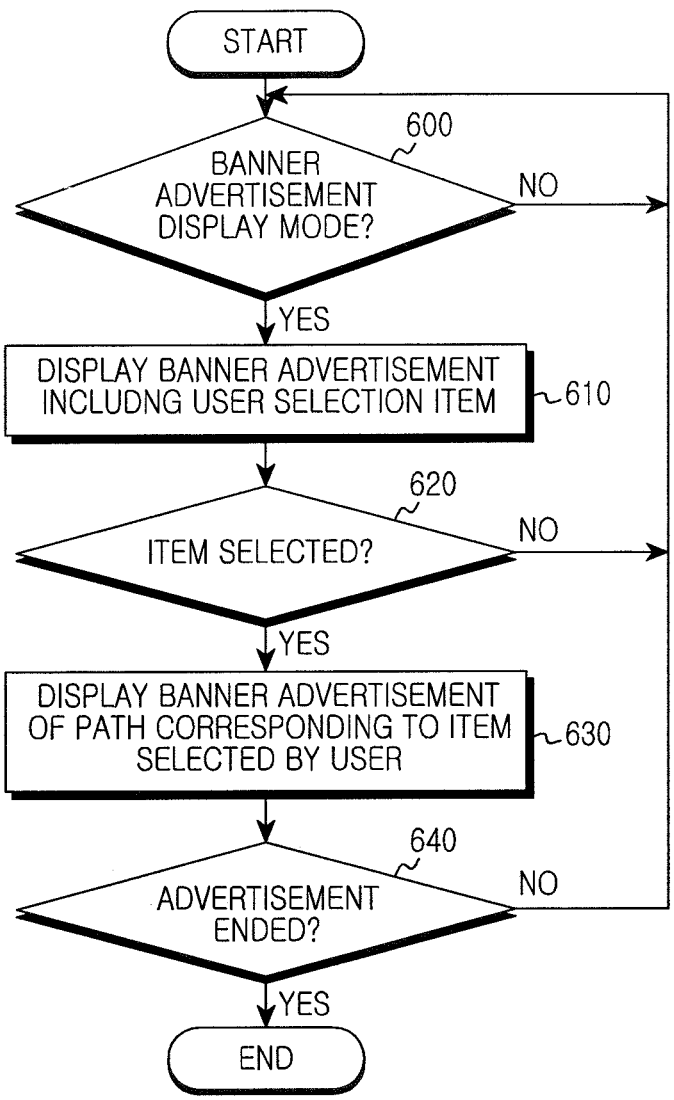
FIG. 6 is a flowchart illustrating an advertisement method of an electronic device according to various exemplary embodiments of the present disclosure.

FIG. 6 is a flowchart illustrating an advertisement method of an electronic device according to various exemplary embodiments of the present disclosure. Electronic devices of various types such as smart phones, tablet PCs or the like may include, for example, the constituent elements illustrated in FIG. 2. The electronic device 200 may be called a terminal.

Referring to FIG. 6, if a banner advertisement display mode is set (S600), the processor 210 of the terminal receives advertising contents transmitted by the advertisement server 410, and displays a banner advertisement image including a user selection item in a partial region of a display screen (S610).

If any one of the user selection items is selected by a user's touch (S620), the processor 210 of the terminal chooses and displays a banner advertisement image of a path corresponding to the selected item (S630), and repeats the above operation until advertisement is ended (S640).

Figure 7:
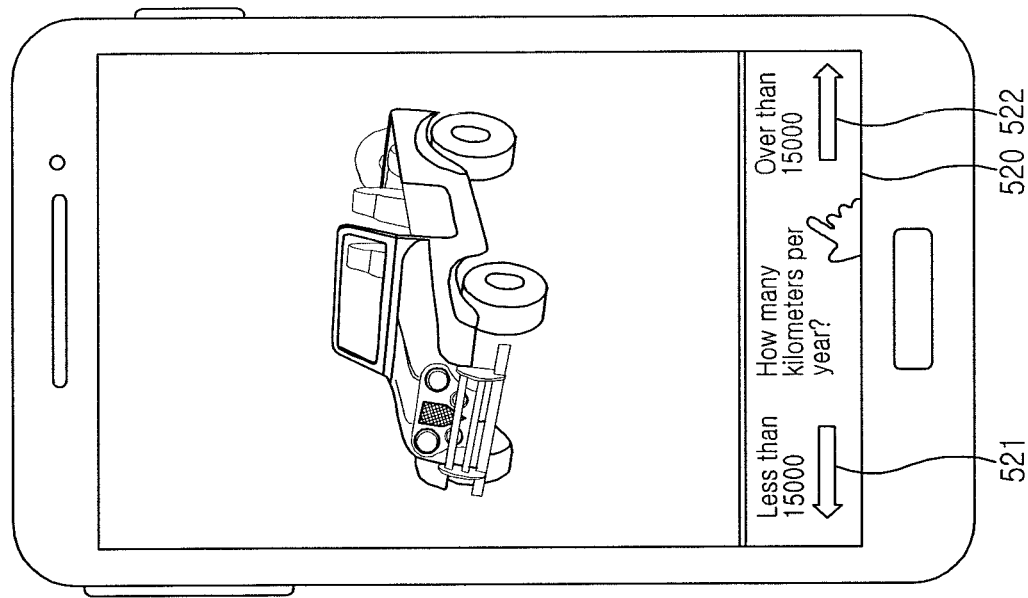
FIG. 7 is a diagram illustrating an advertisement screen of a first path according to various exemplary embodiments of the present disclosure.
Figure 7:
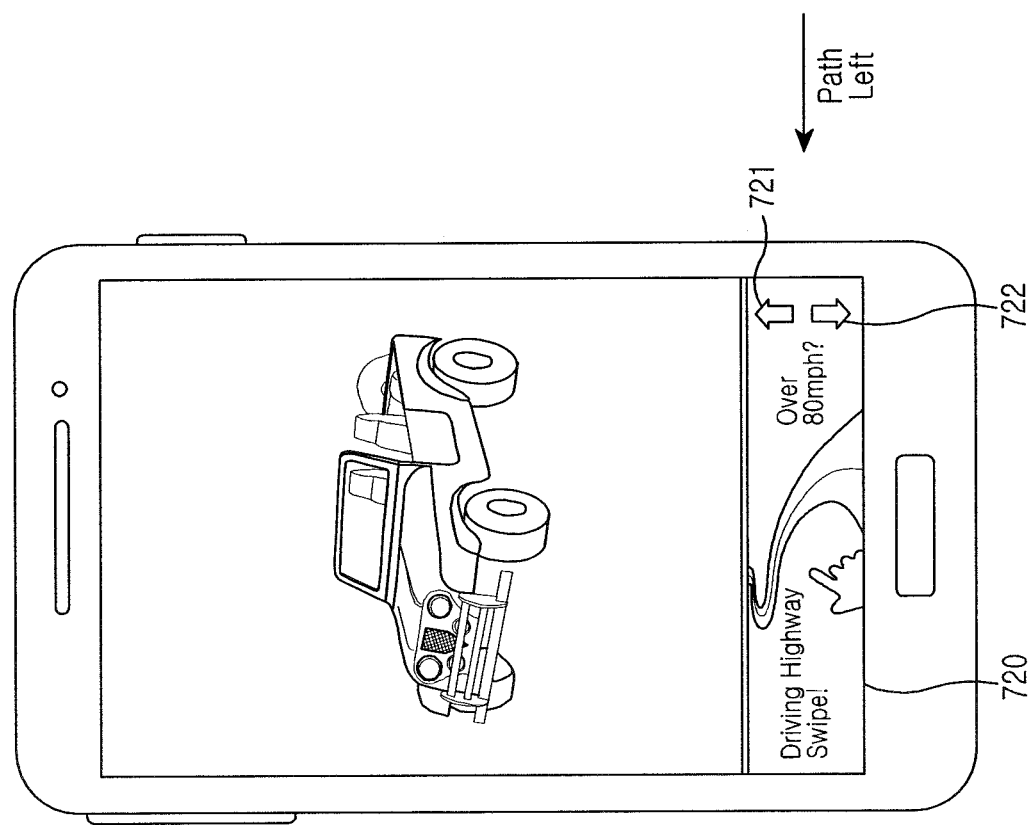

For example, as illustrated in FIG. 7, if a user touches an indicator 521 of a left arrow among the indicator 521 of the left arrow and an indicator 522 of a right arrow displayed in the banner advertisement image 520, the processor 210 of the terminal displays a banner advertisement image 720 of a scenario corresponding to a left path. The processor 210 of the terminal may display an indicator 721 of an up arrow and an indicator 722 of a down arrow in the banner advertisement image 720 of the scenario corresponding to the left path.

Figure 8:
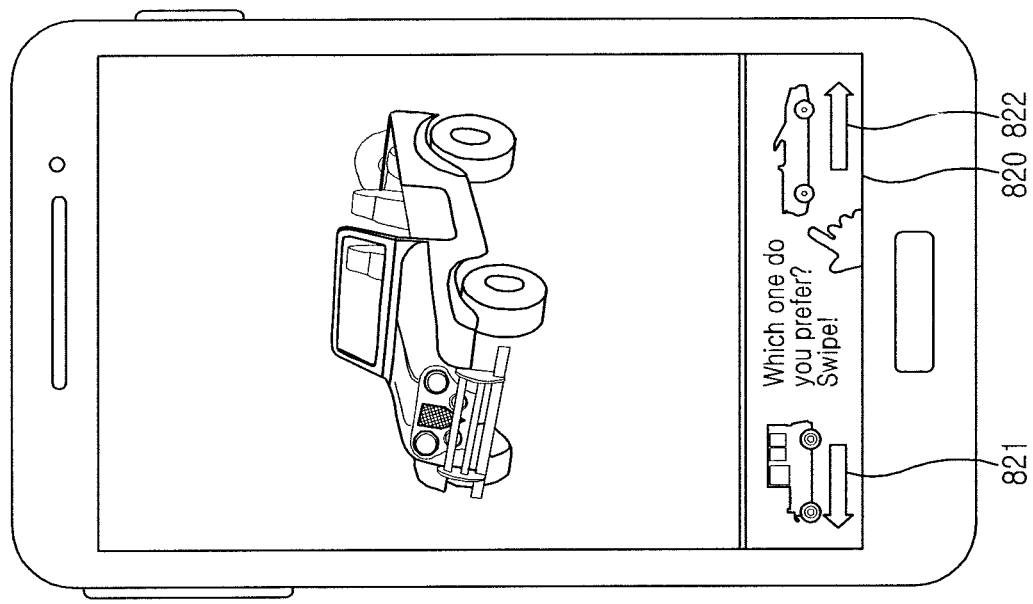
FIG. 8 is a diagram illustrating an advertisement screen of a second path according to various exemplary embodiments of the present disclosure.
Figure 8:
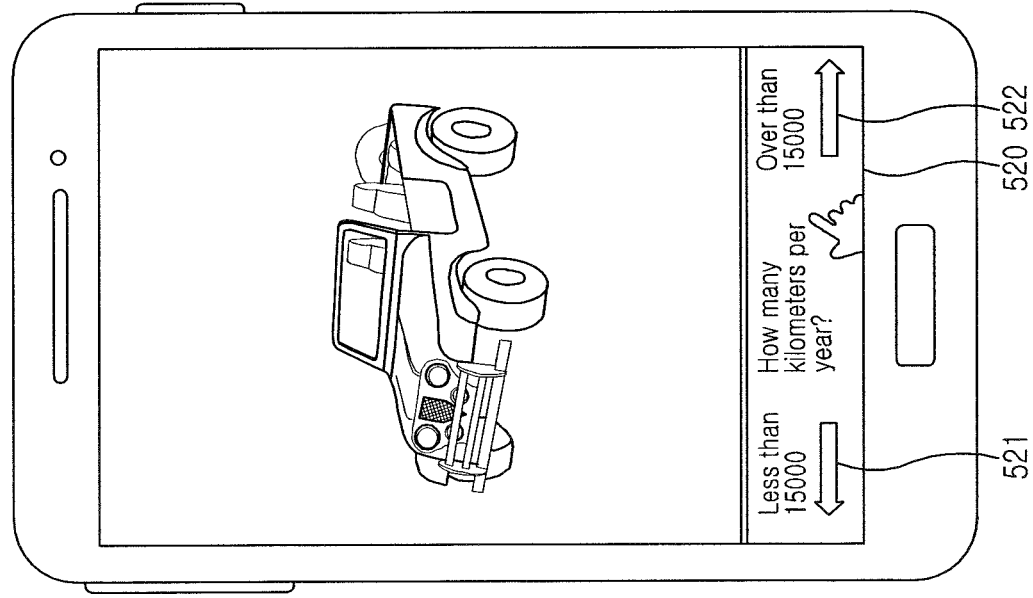

In contrast, for example, as illustrated in FIG. 8, if a user touches an indicator 522 of a right arrow among an indicator 521 of a left arrow and the indicator 522 of the right arrow displayed in the banner advertisement image 520, the processor 210 of the terminal displays a banner advertisement image 820 of a scenario corresponding to a right path. The processor 210 of the terminal may display an indicator 821 of a left arrow and an indicator 822 of a right arrow in the banner advertisement image 820 of the scenario corresponding to the right path.

Figure 9:
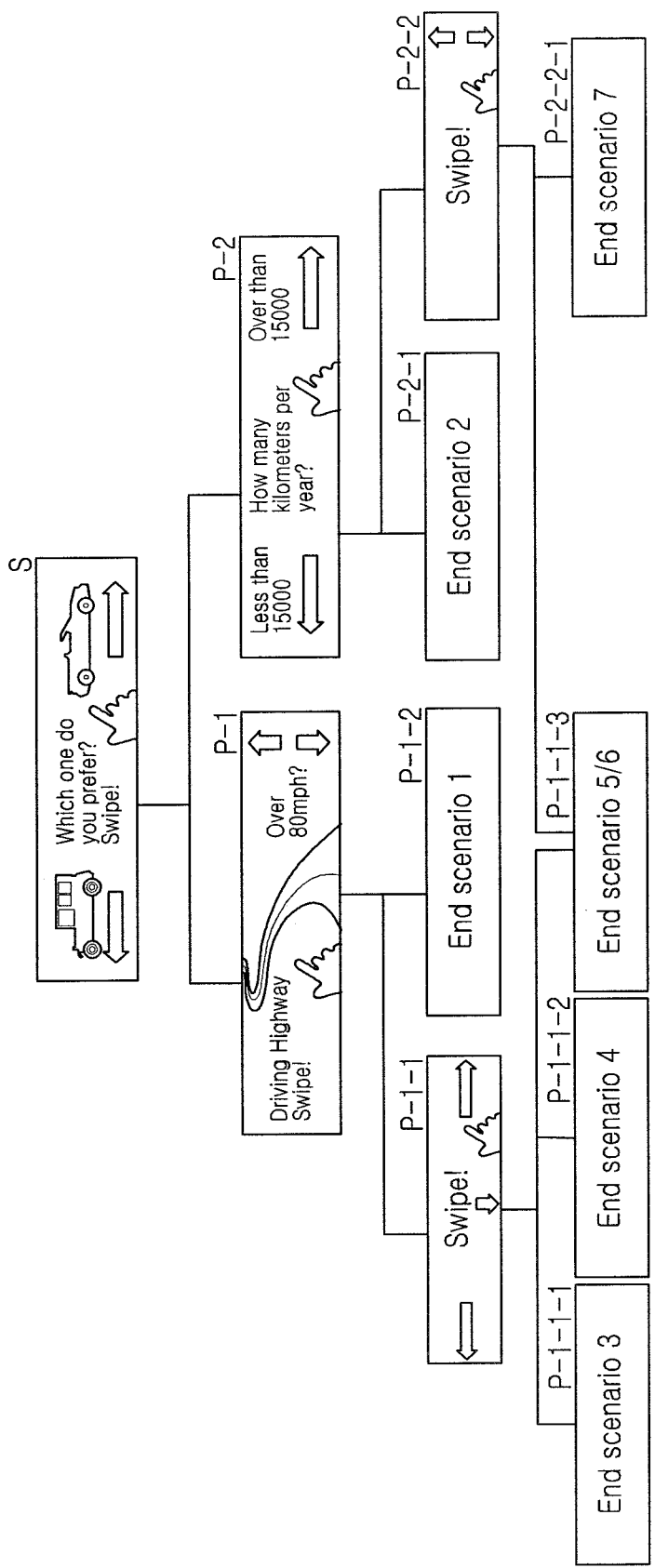
FIG. 9 is a diagram illustrating an advertisement scenario according to various exemplary embodiments of the present disclosure.

The banner advertisement may be manufactured to be displayed variously by a first scenario having a first path, a second scenario having a second path, and the like in accordance to user's selection and the like. For example, as illustrated in FIG. 9, the banner advertisement has various paths capable of being selected by a user, and banner advertisement images of different scenarios may be displayed in accordance to the paths selected by the user.

Any one or more of banner advertisement images of each scenario belonging to the banner advertisement may be duplicated. For example, as illustrated in FIG. 9, a start advertisement scenario (S) is duplicated in a first scenario (scenario 1) and a second scenario (scenario 2), and the start advertisement image (S) and a P-1 advertisement image are duplicated in the first scenario (scenario 1) and a third scenario (scenario 3). That is, each different scenario may share at least one or more advertisement images.

The banner advertisement may be controlled by previously set scenario information. For example, as illustrated in FIG. 10, the scenario information may include various information such as an unique scene id for each advertisement image, an image, a direction User Interface (UI), a link, and the like. For example, the unique scene id (e.g., S) for a start advertisement image is associated with a 640×100 banner advertisement image and direction UIs of the left/right. The direction UI of the left may be linked with a P-1 advertisement image, and the direction UI of the right may be linked with a P-2 advertisement image.

In accordance to this, if a user touches an indicator of a left arrow displayed in the start advertisement image (S) in various methods, the P-1 advertisement image is displayed. If the user touches an indicator of a right arrow displayed in the start advertisement image (S) in various methods, the P-2 advertisement image is displayed. The scenario information may be stored within the advertisement server providing the banner advertisement, or may be downloaded and stored within the terminal receiving the banner advertisement from the advertisement server.

Whenever a user touch takes place on a banner advertisement image, the processor 210 of the terminal may transmit a user's selection result to the advertisement server, and real-time receive banner advertisement of a scenario matching to the user's selection result from the advertisement server and display the received banner advertisement. Or, the processor 210 of the terminal may previously download all or some of the scenario information and banner advertising contents and then, choose and display banner advertisement of a scenario matching to a user's selection result.

While the banner advertisement is displayed or after the banner advertisement is ended, the processor 210 of the terminal may transmit the user's selection result to the advertisement server. For example, if banner advertising contents are a large capacity, the terminal may real-time receive and display only an advertisement image of a partial scene of the banner advertisement through communication with the advertisement server while transmitting the user's selection result to the advertisement server and receiving and displaying an advertisement image of a next scene from the advertisement server.

In contrast, if the banner advertising contents are not the large capacity, the terminal may also receive all of the banner advertisement and the scenario information from the advertisement server and then, choose and display banner advertisement of a scenario matching to user selection in itself. Further, the advertisement server may also divide and provide the banner advertising contents in a previously set chapter unit and the like. The chapter unit is the unit of grouping at least two or more advertisement images on a basis of a branch point of a path of each scenario. The chapter unit may be variously called a group, a bundle or the like.

Figure 11:
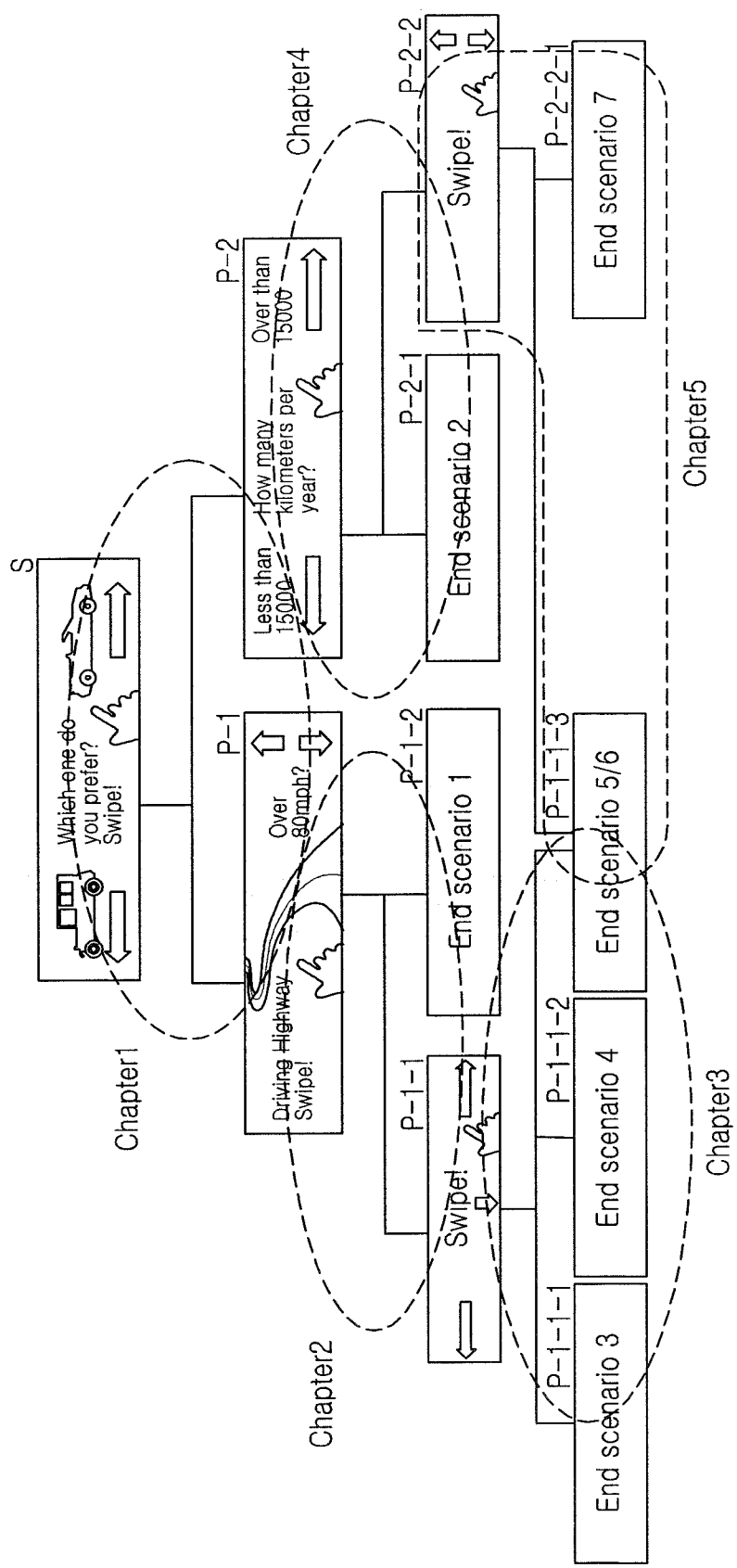
FIG. 11 is a diagram illustrating advertisement scenarios grouped by the unit of chapter according to various exemplary embodiments of the present disclosure.

For example, as illustrated in FIG. 11, the banner advertising contents may be grouped with a plurality of chapters (e.g., chapters 1 to 5). A first chapter (chapter 1) may include one representative advertisement image and two path advertisement images on a basis of a branch point having two paths. The representative advertisement image may be a start advertisement image, and the path advertisement images may be a P-1 advertisement image and a P-2 advertisement image.

A third chapter (chapter 3) may include one representative advertisement image and three path advertisement images on a basis of a branch point having three paths. The representative advertisement image may be a P-1-1 advertisement image, and the path advertisement images may be a P-1-1-1 advertisement image, a P-1-1-2 advertisement image, and a P-1-1-3 advertisement image. One or more of the advertisement images of the chapter unit may be duplicated with an advertisement image of another chapter unit. For example, as illustrated in FIG. 11, the P-1-1-3 advertisement image included in the third chapter (chapter 3) may be repeatedly used even as an advertisement image of a fifth chapter (chapter 5).

The banner advertisement may be controlled by previously set chapter information. For example, as illustrated in FIG. 12, the chapter information may include identification information about a representative advertisement image being a start advertisement image of each chapter and a path advertisement image for which future user selection is possible, and the like.

The identification information about the representative advertisement image and the path advertisement image may be, for example, a unique scene id and the like corresponding to a corresponding advertisement image. The chapter information may be stored within the advertisement server providing the banner advertisement, or may be downloaded and stored within the terminal.

Whenever a user touch takes place on an advertisement image, the processor 210 of the terminal may transmit a user's selection result to the advertisement server. The advertisement server may divide and provide, in the chapter unit, banner advertisement of a scenario matching to the selection result. If a user touch taking place in course of displaying the advertisement image is for selecting a path within one chapter, the processor 210 of the terminal itself may choose and display an advertisement image of a next scene with reference to the chapter information.

For example, if a user touches an indicator of a right arrow in a state in which a start advertisement image (S) of a first chapter has been displayed, the processor 210 of the terminal itself may choose and display a P-2 advertisement image of the first chapter. After that, if the user touches an indicator of a right arrow displayed in the P-2 advertisement image, the processor 210 of the terminal downloads a P-2-1 advertisement image and a P-2-2 advertisement image being path advertisement images of a third chapter, through communication with the advertisement server 410, and then, displays the downloaded P-2-2 advertisement image.

That is, in a case where banner advertising contents provided in the advertisement server have been grouped by the unit of chapter, the terminal may selectively download advertisement images of a next chapter unit, through communication with the advertisement server, in accordance to user selection, and display the advertisement images.

In accordance to this, because the terminal does not have to download all the banner advertising contents and further does not have to perform communication with the advertisement server regarding a user's touch of selecting a path within a chapter, the terminal can efficiently reduce communication traffic on a network.

Figure 13:
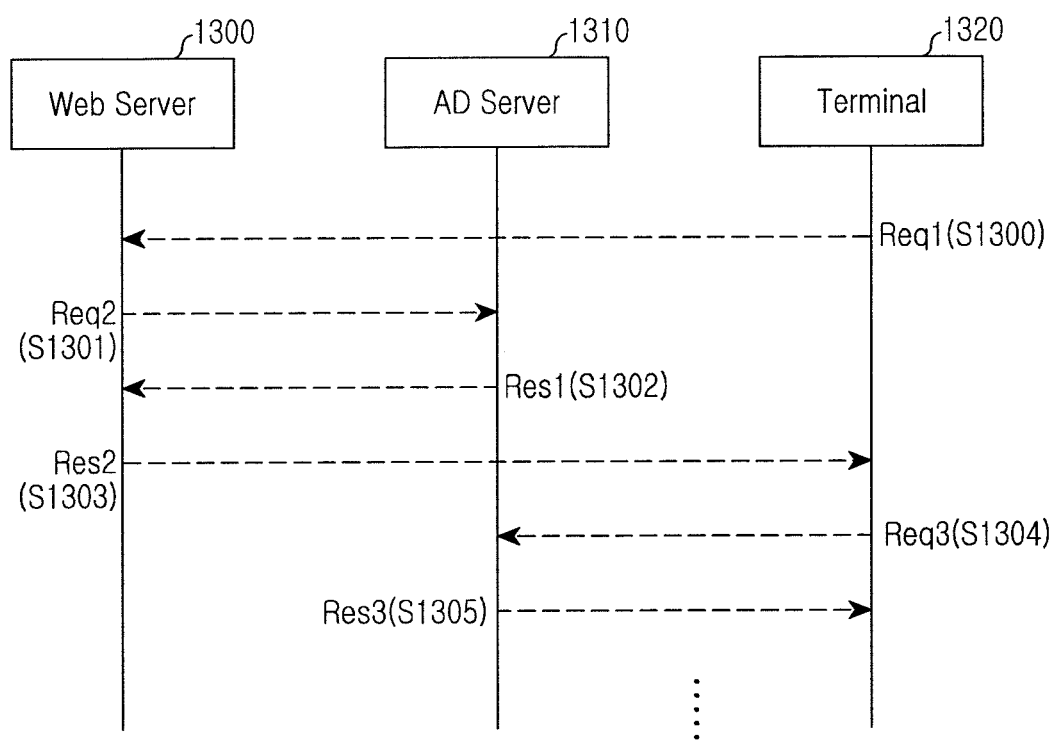
FIG. 13 is a diagram illustrating a Web advertisement service process according to various exemplary embodiments of the present disclosure.

FIG. 13 is a diagram illustrating a Web advertisement service process according to various exemplary embodiments of the present disclosure. As illustrated in FIG. 13, a terminal 1320 such as a smart phone, a tablet PC or the like may access a Web server 1300 through a network, create a request message (req1) of requesting provision of contents desired by a user, and transmit the request message to the Web server 1300 (S1300).

The Web server 1300 may provide contents in response to the request message (req1) of the terminal 1320 or, before providing the contents, the Web server 1300 may access a previously engaged advertisement server 1310 and then transmit a request message (req2) of requesting transmission of banner advertising contents to the advertisement server 1310 (S1301). In response to the request message (req2) received from the Web server 1300, the advertisement server 1310 may create a response message (res1) including at least a portion of previously engaged banner advertisement and then, transmit the response message (res1) to the Web server 1300 (S1302).

The Web server 1300 may create a response message (res2) including a portion of banner advertisement received from the advertisement server 1310 and contents requested by a user of the terminal 1320, and transmit the response message (res2) to the terminal 1320 (S1303). The terminal 1320 may divide the contents and banner advertisement received from the web server 1300 into a main image and a banner advertisement image, and displays the main image and banner advertisement image. After that, if an icon, an indicator or the like included in the banner advertisement image is touched by user's selection, the terminal 1320 may transmit to the advertisement server 1310 a request message (req3) of requesting to transmit banner advertisement of a scenario matching to the user's selection (S1304). The request message (req3) may be transmitted to the advertisement message 1310 via the Web server 1300.

The advertisement server 1310 may check a user selection result included in the request message (req3), and choose banner advertisement of a scenario corresponding to the selection result, and create a response message (res3) included in the chosen banner advertisement of the scenario, and transmit the response message (res3) to the terminal 1320 (S1305). The advertisement server 1310 transmits all of the whole banner advertisement to the terminal 1320, or selectively transmits either a part of the banner advertisement or banner advertisement of a chapter unit in accordance to selection of a user of the terminal 1320, thereby being able to efficiently reduce communication traffic on a network.

Figure 14:
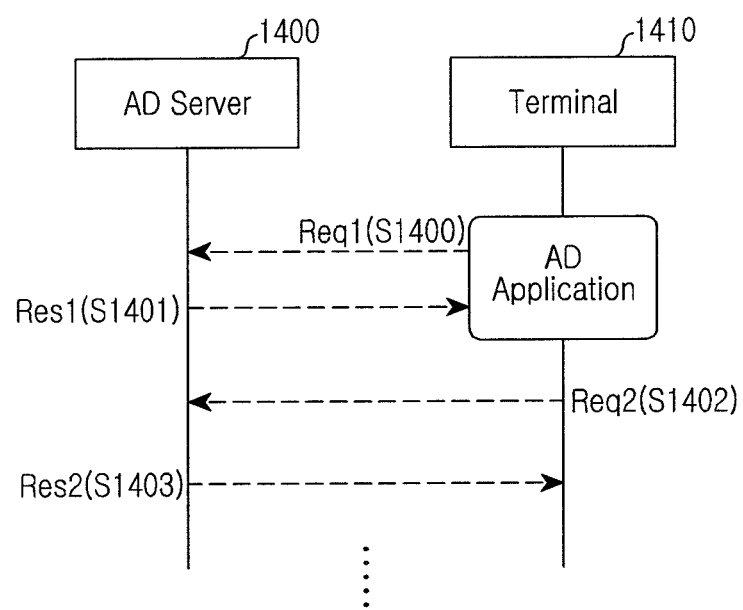
FIG. 14 is a diagram illustrating an App advertisement service process according to various exemplary embodiments of the present disclosure.

FIG. 14 is a diagram illustrating an App advertisement service process according to various exemplary embodiments of the present disclosure.

As illustrated in FIG. 14, a terminal 1410 such as a smart phone, a tablet PC or the like may install, for example, an advertisement application for efficiently displaying banner advertisement. The advertisement application may be variously called AD-APP and the like.

If the advertisement application installed in the terminal 1410 is executed, the terminal 1410 may access an advertisement server 1400 providing banner advertisement and then transmit to the advertisement server 1400 a request message (req1) of requesting provision of banner advertising contents (S1400). In response to the request message (req1) of the terminal 1410, the advertisement server 1400 may create a response message (res1) including at least a part of previously engaged banner advertisement and then, transmit the response message (res1) to the terminal 1410 (S1401).

The terminal 1410 may display the banner advertisement received from the advertisement server 1400 as a banner advertisement image within a partial region of a display screen. After that, if an icon, an indicator or the like included in the banner advertisement image is touched by user's selection, the terminal 1410 may transmit a request message (req2) of requesting to transmit banner advertisement of a scenario matching to the user selection, to the advertisement server 1400 (S1402).

The advertisement server 1400 may check a user selection result included in the request message (req2), and choose banner advertisement of a scenario corresponding to the selection result, and create a response message (res2) included in the chosen banner advertisement of the scenario, and transmit the response message (res2) to the terminal 1410 (S1403). The advertisement server 1400 transmits all of the whole banner advertisement to the terminal 1410, or selectively transmits either a part of the banner advertisement or banner advertisement of a chapter unit in accordance to selection of a user of the terminal 1410, thereby being able to efficiently reduce communication traffic on a network.

The AD-APP of the terminal 1410 is continuously concerned in all operations of performing an operation of requesting, receiving, and displaying banner advertisement, or is concerned only in an initial communication operation with the advertisement server 1400 and, after this, the processor 210 of the terminal 1410 may perform the operation of requesting, receiving, and displaying the banner advertisement. The advertisement server 1400 store and manage the scenario information described earlier with reference to FIG. 10 and the chapter information and the like described earlier with reference to FIG. 12, and may also download the scenario information, the chapter information and the like to the terminal 1410.

FIG. 15 is a diagram illustrating a request parameter according to various exemplary embodiments of the present disclosure.

Referring to FIG. 15, the request parameter is one of telecommunication standards previously established for communication between an advertisement server and a terminal, and may be called arbitrary other name. The request parameter may include information about advertising contents, information about a terminal, information about user interaction, and the like. The information about the advertising contents may be variously called inventory information, and the information about the terminal may be called terminal information, and the information about the user interaction may be called tracking information and the like.

The inventory information may include publisher identification information (publisher's inventory id) providing advertising contents, a public IP address, inventory size information, and the like. The inventory size information is information representing a width and height of banner advertisement, and may be any one or more of 322×76 and 295×169.

The terminal information may include terminal identification information (terminal id) for identifying a terminal, platform version information (platform version), terminal type information (terminal type), and the like. The terminal type information may be any one or more of mobile and tablet, for example. The tracking information may include contents identification information (contents id), user interaction type information (user interaction type), and the like so as to collect user interaction on advertising contents. The user interaction information is, for example, swipe information and may be any one or more of left, right, up, down.

FIG. 16 is a diagram illustrating tracking management information according to various exemplary embodiments of the present disclosure.

Referring to FIG. 16, the tracking management information is, for example, information managed in a database form in an advertisement server and the like, and may be called arbitrary other name. The tracking management information may collect and analyze user interaction on advertising contents, and be used for various usages and the like for providing more improved advertising contents. For example, as illustrated in FIG. 16, the tracking management information may include tracking type information, contents id information, object type information, action type information, terminal unique id information, user interaction information, staying time information, and the like.

The tracking type information may be information for distinguishing if a message transmitted from the terminal to the advertisement message is a request message or is a response message and the like. The object type information may be information for distinguishing if an object selected by a user of the terminal is an image within advertisement or is a button and the like.

The action type information may be information for distinguishing if an action selected by the user of the terminal is 'click to call' or is 'click to web' and the like. The user interaction information may be information for distinguishing if user interaction of the terminal is advertisement open, advertisement play, swipe for selecting a path desired by the user, and the like. The staying time information may be time information during which the user of the terminal keeps viewing any one advertisement.

An operator or publisher who operates the advertisement server may analyze the tracking management information managed in the database form as above, thereby easily checking advertising contents much viewed by users of terminals. Further, the operator or publisher may check banner advertisement of a scenario much selected by the users of the terminals, and utilize the checked banner advertisement as reference data useful for manufacturing of new advertising contents.

According to an exemplary embodiment of the present disclosure, since a user of an electronic device such as a smart phone, a tablet PC or the like may view banner advertisement of a scenario matching to his/her own selecting path, an advertisement effect may be improved, and an operator or publisher who operates an electronic device such as an advertisement server and the like may provide banner advertisement of various scenarios desired by the user.

Also, according to an exemplary embodiment of the present disclosure, since tracking management information about advertising contents may be collected and analyzed, the advertising contents may be improved efficiently. An electronic device such as an advertisement server and the like may divide and transmit, by the unit of chapter and the like, banner advertisement of a scenario matching to a path selected by a user of a terminal, thereby efficiently decreasing communication traffic on a network.

Methods according to exemplary embodiments stated in claims or specification of the present disclosure may be implemented in a form of hardware, software, or a combination of hardware and software. If the methods are implemented by the software, a computer-readable storage medium storing one or more programs (i.e., software modules) may be provided. The one or more programs stored in the computer-readable storage medium are configured to be executed by one or more processors within an electronic device.

The one or more programs include instructions for enabling the electronic device to execute the methods according to the exemplary embodiments stated in the claims or specification of the present disclosure. These programs (i.e., software modules or software) may be stored in a Random Access Memory (RAM), a nonvolatile memory including a flash memory, a Read Only Memory (ROM), an Electrically Erasable Programmable ROM (EEPROM), a magnetic disk storage device, a Compact Disk ROM (CD-ROM), a Digital Video Disk (DVD) or an optical storage device of other form, and a magnetic cassette.

Or, the programs may be stored in a memory constructed by a combination of some or all of them. Also, each constructed memory may be included in plural. The programs may be stored in an attachable storage device accessible through a communication network such as the Internet, an intranet, a Local Area Network (LAN), a Wireless LAN (WLAN) and a Storage Area Network (SAN) or a communication network constructed by a combination of them. This storage device may access a device performing an exemplary embodiment of the present disclosure through an external port. Also, a separate storage device on the communication network may access the device performing the exemplary embodiment of the present disclosure.

In the aforementioned concrete exemplary embodiments of the present disclosure, constituent elements included in the disclosure have been expressed in the singular number or the plural number in accordance to the proposed concrete exemplary embodiments. But, for description convenience, the expression of the singular number or plural number is merely selected suitable to a proposed situation, and the present disclosure is not limited to singular or plural constituent elements. Even the constituent element expressed in the plural number may be constructed in the singular number, or even the constituent element expressed in the singular number may be constructed in the plural number. While the concrete exemplary embodiment has been shown and described in a detailed description of the present disclosure, it is undoubted that various changes in form and details may be made therein without departing from the scope of the present disclosure. Therefore, the scope of the present disclosure should not be limited and defined by the described exemplary embodiments and should be defined by not only the appended claims but also equivalents to the appended claims.

What is claimed is:

1. A method of an electronic device, the method comprising:
    receiving, from a first server, webpage content including data corresponding to a banner advertisement capable of being displayed at the electronic device, the data corresponding to the banner advertisement including a scenario tree data structure comprising a plurality of content nodes;
    detecting an event associated with the banner advertisement;
    determining whether content associated with the banner advertisement has been previously downloaded to the electronic device;
    in response to determining that content associated with the banner advertisement was not previously downloaded to the electronic device:
        transmitting, to a second server different from the first server, a request for information regarding the content associated with the banner advertisement,
        receiving, from the second server, data associated with at least one of the content nodes of the banner advertisement, and
        displaying a first screen including content associated with a first content node of the banner advertisement; and
    in response to determining that content associated with the banner advertisement was previously downloaded to the electronic device:
        retrieving data associated with the first content node of the banner advertisement from a memory of the electronic device, and
        displaying the first screen including the content associated with the first content node of the banner advertisement.

2. The method of claim 1,
    wherein the content associated with the first content node of the banner advertisement includes a plurality of user selectable items, and
    wherein each of the user selectable items comprises at least one of an icon or an indicator.

3. The method of claim 1, further comprising:
    receiving a first input corresponding to the content associated with the first content node of the banner advertisement when the first screen is displayed,
    wherein the first input comprises at least one of a drag, a swipe, or a tap.

4. The method of claim 1, wherein the data associated with the first content node of the banner advertisement comprises at least one of an image, a direction user interface (UI), or a link.

5. The method of claim 1,
    wherein a scenario of the banner advertisement includes a plurality of sub scenarios, and
    wherein at least two of the plurality of sub scenarios of the banner advertisement share at least one advertisement image.

6. An electronic device comprising:
    a communication interface;
    a display;
    a memory configured to store instructions; and
    at least one processor, coupled to the memory and the display, configured to execute the instructions to:
        receive, from a first server via the communication interface, webpage content including data corresponding to a banner advertisement capable of being displayed on the display, the data corresponding to the banner advertisement including a scenario tree data structure comprising a plurality of content nodes,
        detect an event associated with the banner advertisement,
        determine whether content associated with the banner advertisement has been previously downloaded to the electronic device,
        in response to determining that content associated with the banner advertisement was not previously downloaded to the electronic device:
            transmit, to a second server different from the first server via the communication interface, a request for information regarding the content associated with the banner advertisement,
            receiving, from the second server via the communication interface, data associated with at least one of the content nodes of the banner advertisement, and
            display, on the display, a first screen including content associated with a first content node of the banner advertisement, and in response to determining that content associated with the banner advertisement was previously downloaded to the electronic device:
retrieve data associated with the first content node of the banner advertisement from the memory, and display, on the display, the first screen including the content associated with the first content node of the banner advertisement.

7. The electronic device of claim 6,
wherein the content associated with the first content node of the banner advertisement includes a plurality of user selectable items, and
wherein each of the user selectable items comprises at least one of an icon or an indicator.

8. The electronic device of claim 6,
wherein the at least one processor is further configured to receive a first input corresponding to the content associated with the first content node of the banner advertisement when the first screen is displayed, and
wherein the first input comprises at least one of a drag, a swipe, or a tap.

9. The electronic device of claim 6, wherein the data associated with the first content node of the banner advertisement comprises at least one of an image, a direction user interface (UI), or a link.

10. The electronic device of claim 6,
wherein a scenario of the banner advertisement includes a plurality of sub scenarios, and
wherein at least two of the plurality of sub scenarios of the banner advertisement share at least one advertisement image.

11. The method of claim 1, further comprising:
transmitting information associated with a type of the electronic device,
wherein the information associated with the type of the electronic device indicates a size of the electronic device,
wherein a size of the banner advertisement is identified based on the size of the electronic device, and
wherein the content associated with the banner advertisement is identified based on the size of the banner advertisement.

12. The method of claim 1, further comprising:
receiving a first input for selecting a portion of content associated with the first content node of the banner advertisement; and
determining whether the first input corresponds to a first sub scenario or a second sub scenario.

13. The method of claim 12, further comprising:
in response to determining that the first input corresponds to the first sub scenario, displaying a second screen including content associated with a second content node of the banner advertisement; and
in response to determining that the first input corresponds to the second sub scenario, displaying a third screen including content associated with a third content node of the banner advertisement.

14. The method of claim 12, further comprising:
determining whether content associated with the first sub scenario was previously downloaded to the electronic device when the first input corresponds to the first sub scenario;
in response to determining that the content associated with the first sub scenario was not previously downloaded to the electronic device:
transmitting, to the second server, a request for information associated with the first sub scenario,
receiving, from the second server, data associated with at least one of the content nodes of the banner advertisement included in the first sub scenario, and
displaying a second screen including content associated with a second content node, the first sub scenario including the second content node; and
in response to determining that the content associated with the first sub scenario was previously downloaded to the electronic device:
retrieving data associated with the second content node from the memory of the electronic device, and
displaying the second screen including the content associated with the second content node.

15. The method of claim 12,
wherein the first content node is a parent node,
wherein the second content node is a first child node of the first content node, and
wherein the third content node is a second child node of the first content node.

16. The method of claim 1, wherein the content includes at least one user selectable visual indicator.

17. The method of claim 1, further comprising:
receiving the plurality of the content nodes of the banner advertisement before the event associated with the banner advertisement is detected; and
storing the plurality of content nodes of the banner advertisement in the memory of the electronic device.

18. The method of claim 1, wherein the receiving of the data associated with at least one of the content nodes of the banner advertisement further comprises:
receiving the data associated with all of the content nodes of the banner advertisement.

19. The method of claim 1, wherein the receiving of the data associated with at least one of the content nodes of the banner advertisement further comprises:
receiving the data associated with one content node of the banner advertisement.

20. The method of claim 1,
wherein the receiving of the data associated with at least one of the content nodes of the banner advertisement further comprises:
receiving the data associated with a number of content nodes of the banner advertisement, and
wherein the number of content nodes is greater than one content node and less than all of the content nodes of the banner advertisement.

21. The method of claim 20, wherein the number of content nodes of the banner advertisement correspond to one of a plurality of chapters included in a scenario of the banner advertisement.

22. The method of claim 21, wherein at least one content node is included in two different chapters of the scenario of the banner advertisement.

23. The method of claim 22, wherein data associated with the at least one content node included in two different chapters of the scenario of the banner advertisement includes data associated with at least one advertisement image.

* * * * *